(12) United States Patent
Huber et al.

(10) Patent No.: US 11,401,379 B2
(45) Date of Patent: Aug. 2, 2022

(54) ORAGANOCARBONATE-MODIFIED PREPOLYMER, ITS USE AS A REACTANT FOR THE PREPARATION OF ISOCYANATE-FREE AND ISOTHIOCYANATE-FREE ALKOXYSILANE POLYMERS, AND COMPOSITIONS THEREOF

(71) Applicant: MERZ+BENTELI AG, Niederwangen (CH)

(72) Inventors: Stefan Huber, Langenthal (CH); Fritz Burkhardt, Oberburg (CH); Claude Lerf, Meyriez (CH)

(73) Assignee: MERZ+BENTELI AG, Niederwangen (CH)

( * ) Notice: Subject to any disclaimer, the term of this patent is extended or adjusted under 35 U.S.C. 154(b) by 254 days.

(21) Appl. No.: 16/330,721

(22) PCT Filed: Sep. 4, 2017

(86) PCT No.: PCT/EP2017/072069
§ 371 (c)(1),
(2) Date: Mar. 5, 2019

(87) PCT Pub. No.: WO2018/042030
PCT Pub. Date: Mar. 8, 2018

(65) Prior Publication Data
US 2019/0352461 A1    Nov. 21, 2019

(30) Foreign Application Priority Data
Sep. 5, 2016 (EP) ................................. 16187265

(51) Int. Cl.
*C08G 71/04* (2006.01)
*C09J 175/12* (2006.01)
*C09K 3/10* (2006.01)
*C08G 64/42* (2006.01)

(52) U.S. Cl.
CPC ........... *C08G 71/04* (2013.01); *C09J 175/12* (2013.01); *C09K 3/1021* (2013.01); *C08G 64/42* (2013.01); *C09K 2200/065* (2013.01)

(58) Field of Classification Search
CPC . C08G 18/44; C08G 18/4692; C08G 18/5096
See application file for complete search history.

(56) References Cited

U.S. PATENT DOCUMENTS

| 4,518,766 | A | | 5/1985 | Greco et al. | |
|---|---|---|---|---|---|
| 5,220,047 | A | * | 6/1993 | Pohl | C03C 17/30 556/420 |
| 7,732,554 | B2 | * | 6/2010 | O'Keefe | C08G 18/10 528/28 |
| 2008/0076899 | A1 | * | 3/2008 | O'Keefe | C08G 18/089 528/28 |
| 2010/0155644 | A1 | * | 6/2010 | Ou | C08L 83/10 252/62 |
| 2011/0034627 | A1 | * | 2/2011 | Boudet | C09J 175/04 524/588 |
| 2014/0242399 | A1 | * | 8/2014 | Nabuurs | C08G 18/289 428/447 |
| 2018/0291153 | A1 | * | 10/2018 | Cron | C08G 71/04 |

FOREIGN PATENT DOCUMENTS

| CN | 101712757 A | 5/2010 |
|---|---|---|
| DE | 102 59 248 A1 | 7/2003 |
| EP | 0 229 678 A2 | 7/1987 |
| EP | 1 371 670 A1 | 12/2003 |
| EP | 1 852 455 A1 | 11/2007 |
| EP | 1 944 329 A1 | 7/2008 |
| EP | 2 341 116 A1 | 7/2011 |
| JP | 2002-241483 A | 8/2002 |
| JP | 2007-297629 A | 11/2007 |
| JP | 2009-084550 A | 4/2009 |
| WO | 03/018658 A1 | 3/2003 |
| WO | 2008/031895 A1 | 3/2008 |

OTHER PUBLICATIONS

Nov. 24, 2017 International Search Report issued in International Patent Application No. PCT/EP2017/072069.
Dec. 31, 2021 Office Action issued in Chinese Patent Application No. 201780054027.0.
Sep. 21, 2021 Office Action issued in Japanese Patent Application No. 2019-533675.

* cited by examiner

*Primary Examiner* — Margaret G Moore
(74) *Attorney, Agent, or Firm* — Oliff PLC

(57) ABSTRACT

The use of an organocarbonate-modified prepolymer having at least an average of 1.5 carbonate, thiocarbonate, carbamate or thiocarbamate groups bonded directly to the polymer backbone each via an oxygen atom, where each of these oxygen atoms has its origin in the reaction of a primary, secondary or tertiary hydroxyl group of the polymer backbone and a reactive compound selected from the group consisting of a diorganocarbonate, a diorganothiocarbonate, a cyclic carbonate, a cyclic thiocarbonate, an N,N-diheterocyclourea derivative and an N,N-diheterocyclothiourea derivative. Also, the preparation of the alkoxysilane polymers.

3 Claims, No Drawings

ORAGANOCARBONATE-MODIFIED PREPOLYMER, ITS USE AS A REACTANT FOR THE PREPARATION OF ISOCYANATE-FREE AND ISOTHIOCYANATE-FREE ALKOXYSILANE POLYMERS, AND COMPOSITIONS THEREOF

The present invention relates to the use of an organocarbonate-modified prepolymer as reactant for preparing isocyanate-free and isothiocyanate-free alkoxysilane polymers, and also to the preparation of these alkoxysilane polymers.

Silane-modified polymers (SMPs) have already been known to the skilled person for some considerable time. Said compounds in general constitute moisture-reactive polymers and are employed in particular in moisture-curing sealants or adhesives.

A common feature of all silane-modified polymers is that as well as an organic polymer backbone they have at least one hydrolyzable silyl group which is bonded via corresponding coupling groups to the polymer chain.

With the usual processes for preparing silane-modified polymers, only a relatively limited number of commercial products are accessible. Depending on the mode of preparation, the selection of possible polymer chains is limited to a greater or lesser extent.

As well as the copolymerization, graft copolymerization, and polyaddition reactions which lead to randomly silylated polymers, the polymers are also described through reaction of an isocyanate group with an isocyanate-reactive group.

Accordingly, for instance in WO 03/018658, a process is described in which a silane having an OH, SH or $NHR^3$ group is reacted with an isocyanate-terminated prepolymer. Alternatively, according to said publication, a silane having an isocyanate group is reacted with an isocyanate-reactive prepolymer, in particular a prepolymer having OH, SH or $NHR^3$ groups. Isocyanates are known to be highly toxic, so necessitating the relatively stringent and expensive safety measures during the preparation and onward use of these compounds. With these preparation processes, moreover, it is hardly possible to obtain isocyanate-free prepolymers or isocyanate-free polymers.

EP-A-1371670 describes a process in which a vinyl polymer having at least one hydroxyl group is reacted with a compound which as well as a silyl group has a group which is able to react with the hydroxyl group. Mention is also made in this regard specifically of an isocyanate group.

EP-A-2341116 describes a polymeric compound comprising a polymer chain and at least one silyl group bonded to the polymer chain, the polymer chain and the silyl group being connected to one another by a β-hydroxyamine group. The amine-terminated or epoxy-terminated prepolymers used as reactants for the synthesis of these polymers are of only limited large-scale availability and are relatively expensive. Industrially, the reactants are used as an addition to polymer compositions, but not as prepolymers for a self-standing polymer, and this sharply detracts from their availability. Starting from this base, the object of the present invention is that of providing a prepolymer as a reactant for the preparation of alkoxysilane polymers, and also the preparation thereof by means of the prepolymer, the intention being that the use of isocyanates and thioisocyanates should be avoided. A further intention is that the polymer and the prepolymer should be prepared by a very simple process, and that their properties should be able to be set in a targeted way from a large variability of possible properties.

The object is achieved in accordance with the invention by the use of the prepolymer as and by the process for preparing the alkoxysilane polymers as described herein.

The present invention relates accordingly to the use of a prepolymer having at least on average 1.5 carbonate groups of the formulae (I) and (II) or thiocarbonate groups of the formulae (Ia) and (IIa), carbamate groups of the formulae (XI) and (XII) or thiocarbamate groups of the formulae (XIa) and (XIIa)

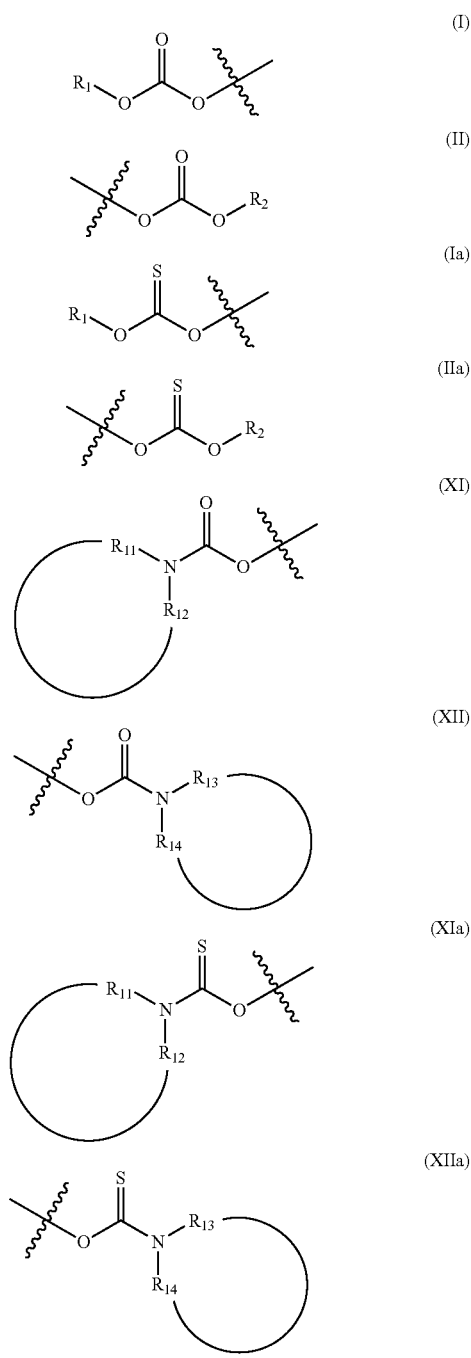

in which $R^1$ and $R^2$ independently of one another are linear or branched $C_1$ to $C_6$ alkyl, $C_1$ to $C_6$ acyl, $C_3$ to $C_8$ cycloaliphatic, $C_6$ to $C_{10}$ aryl or imide radicals or $C_3$ to $C_6$ alcohols, $R^{11}$ and $R^{22}$ and also $R^{13}$ and $R^{14}$ in each case together form heterocyclic ring systems which may be aromatic or nonaromatic and are independent of one another, and where these ring systems may contain further
heteroatoms selected from the group of oxygen, nitrogen, and sulfur or may contain functional groups selected from the group of acyl and thioacyl,
as a reactant for the isocyanate-free and isothiocyanate-free preparation of alkoxysilane polymers, whose alkoxysilane groups are bonded via carbamate groups, thiocarbonate groups or thiocarbamate groups to the polymer backbone,
where the at least on average 1.5 carbonate, thiocarbonate, carbamate or thiocarbamate groups are bonded directly via one oxygen atom each to the polymer backbone, this one oxygen atom each having its origin in the reaction of a primary, secondary or tertiary hydroxyl group of the polymer backbone and a reactive compound selected from the group consisting of a diorganocarbonate, a diorganothiocarbonate, a cyclic carbonate, a cyclic thiocarbonate, an N,N-diheterocyclourea derivative, and an N,N-diheterocyclothiourea derivative.

It preferably relates in particular to the use of a prepolymer having at least on average 1.5 carbonate groups

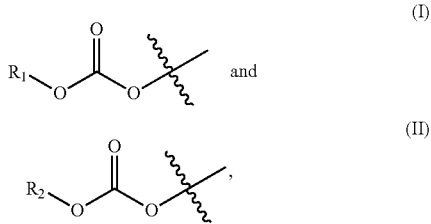

in which $R^1$ and $R^2$ independently of one another are linear or branched $C_1$ to $C_6$ alkyl radicals (as for example methyl, ethyl, propyl), $C_1$ to $C_6$ acyl radicals, $C_3$ to $C_8$ cycloaliphatic radials (as for example cyclopentyl or cyclohexyl), $C_6$ to $C_{10}$ aryl radicals (as for example phenyl) or imide radicals (as for example succinimide or maleinimide) or $C_3$ to $C_6$ alcohols (as for example propanol, butanol or 1,3-propanediol), as a reactant for the isocyanate-free and isothiocyanate-free preparation of alkoxysilane polymers whose alkoxysilane groups are bonded via carbamate groups, thiocarbonate groups or thiocarbonate groups to the polymer backbone, where the at least on average 1.5 carbonate groups are bonded directly via one oxygen atom each to the polymer backbone, and this one oxygen atom each has its origin in the transesterification reaction of a hydroxyl group of the polymer backbone and a diorganocarbonate or a cyclic carbonate.

The expression "on average 1.5 carbonate groups or carbamate groups" refers to the number of carbonate groups or carbamate groups, respectively, which, according to the ending of the reaction, are bonded directly via one oxygen atom each to the polymer backbone of the prepolymer of the invention. The number of carbonate groups or of carbamate groups does not match exactly with the number of primary, secondary or tertiary hydroxyl groups on the polymer backbone, since in some cases the reaction does not proceed to completion, for example 1.5 carbonate groups or carbamate groups to 2 hydroxyl groups. The average number of carbonate or carbamate groups may be ascertained by the determination of OH numbers, as known to the skilled person. The average number of carbonate groups or of carbamate groups is preferably at least 1.7 carbonate or carbamate groups, respectively, per prepolymer, and more preferably at least 1.8 carbonate or carbamate groups, respectively, per prepolymer. The same applies in respect of the thiocarbonate and thiocarbamate groups.

It has been ascertained that the use of the prepolymer of the invention permits isocyanate-free and isothiocyanate-free preparation of alkoxysilane polymers. At the same time, the properties of these polymers can be set in a targeted way with a great variability. The prepolymer of the invention represents a kind of modular "building block system", allowing a preferred polymer backbone to be selected for a desired alkoxysilane polymer in accordance with the properties desired.

Candidates for a possible polymer backbone are a multiplicity of different polymer chains, which are available inexpensively in large quantities. The only condition which the polymer backbone is required to meet as a reactant for the subsequent reaction to form the prepolymer of the invention is that there must be at least two hydroxyl groups, which may alternatively be primary, secondary or tertiary.

These at least two primary, secondary or tertiary hydroxyl groups are converted by simple transesterification into at least on average 1.5 carbonate groups, which represent the reactive groups of the prepolymer. This means that the oxygen atom via which the carbonate group is bonded directly to the polymer backbone has its origin in the transesterification reaction of a hydroxyl group of the polymer backbone and a diorganocarbonate or a cyclic carbonate. The preparation of the prepolymer may be prepared, accordingly, from a polymeric compound having a polymer backbone of at least two primary, secondary or tertiary hydroxyl groups, by reaction with a diorganocarbonate or a cyclic carbonate. These polymers of the invention can be prepared simply and inexpensively.

Alternatively, these at least two primary, secondary or tertiary hydroxyl groups are converted into at least on average 1.5 carbamate groups, which represent the reactive groups of the prepolymer. This means that the oxygen atom by which the carbamate group is bonded directly to the polymer backbone has its origin in the reaction of a hydroxyl group of the polymer backbone and an N,N-diheterocyclourea derivative. The preparation of the prepolymer may also be prepared, accordingly, from a polymeric compound having a polymer backbone of at least two primary, secondary or tertiary hydroxyl groups, by reaction with an N,N-diheterocyclourea derivative. The same is also true of thiocarbamate groups. These prepolymers of the invention allow the preparation of polymers having a relatively high cross-linking density. Moreover, the heterocyclic ring systems that are formed in the reaction accelerate the reaction.

The expressions N,N-diheterocyclourea derivative and N,N-diheterocyclothiourea derivative refer in the present invention to compounds of the general formula (A) and (B),

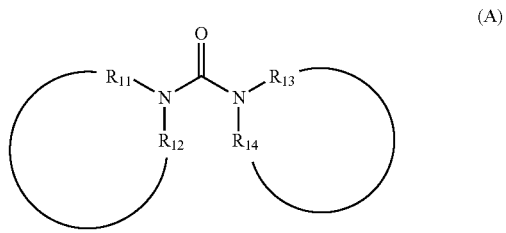

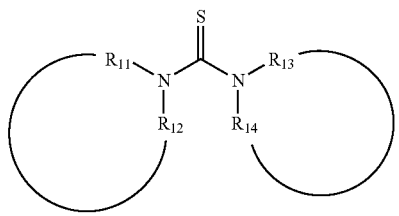

(B)

in which $R^{11}$ and $R^{12}$ and also $R^{13}$ and $R^{14}$ each together form heterocyclic ring systems which may be aromatic or nonaromatic and are independent of one another, and where these ring systems, as well as the nitrogen atom which is a constituent of the urea or thiourea compound, may contain further heteroatoms selected from the group of oxygen, nitrogen, and sulfur or may contain functional groups selected from the group of acyl and thioacyl. The heterocyclic ring systems here are preferably of 5 to 14 members and may be monocyclic or bicyclic. The monocyclic ring systems are preferably 5- to 7-membered and the bicyclic ring systems are preferably 10- to 12-membered.

The N,N-diheterocyclourea derivative is preferably selected from the group consisting of 1,1'-carbonyldiimidazole (CDI), 1,1'-carbonyldibenzimidazole, 1,1'-carbonyldi (1,2,4)-triazole (CDT), 1,1'-carbonylbis(2-methylimidazole), 1,1'-carbonyldibenzotriazole and carbonylbiscaprolactam (CBC), and more preferably 1,1'-carbonyldiimidazole (CDI).

Because the at least two primary, secondary or tertiary hydroxyl groups may be located on the terminal ends of the polymer backbone, on the polymer backbone itself, or on a side chain, it is possible to select from a massive pool of starting compounds.

By virtue of these at least on average 1.5 carbonate, thiocarbonate, carbamate or thiocarbamate groups, it is possible to avoid the use of the highly toxic isocyanate and isothiocyanate groups.

Furthermore, as the polymer backbone, it is also possible to use natural or renewable oligomeric or polymeric raw materials which have at least two primary, secondary or tertiary hydroxyl groups or are modified so as to have at least two primary, secondary or tertiary hydroxyl groups, thereby opening access, for example, to adhesives and sealants or coatings having a very high proportion of renewable raw materials. The prepolymer of the invention hence provides access to the possibility of providing eco-friendly and toxicologically unobjectionable adhesives and sealants, this being of great interest, in particular, for the construction industry and for the vehicle industry (auto, aircraft, and marine industry).

The prepolymer of the invention allows both the properties of the noncrosslinked polymers (as for example melting point, viscosity, solubility) and the properties of the ready-crosslinked materials (as for example hardness, elasticity, tensile strength, elongation at break, chemical resistance, thermal stability, and photolytic resistance) to be adjusted almost ad infinitum and in a simple way. With particular preference, because of the improved processing properties, the prepolymer of the invention is liquid at room temperature.

The chain length and therefore the molecular weight of the prepolymer has a great influence on the properties of the prepolymer. Preferably the prepolymer has an average molecular weight Mw of 100 to 200 000 g/mol, preferably of 5000-50 000 g/mol. This average molecular weight Mw is determined by gel permeation chromatography (tetrahydrofuran as eluent in accordance with DIN 55672-1:2016-03 against polystyrene standard).

The term "silyl group" refers in connection with the present invention to any (organo-)silyl groups, including, in particular, substituted silyl groups and silyloxy groups, as set out later on below.

The term "amino group", as used in the context of the present invention, includes both primary and secondary amino groups. They may be present in linear, cyclic or aromatic forms.

Preferably the polymer backbone [A] of the prepolymer of the invention is linear or branched and is selected from the group consisting of
- polyethers (as for example polyvinyl alcohol, polyethylene glycol, and polypropylene glycol),
- polyolefins (as for example polyethylene, polypropylene, polybutadiene, polystyrene, polyacrylonitrile-butadiene, and polyvinyl chloride),
- polyesters (as for example polybutylene terephthalate, polyethylene terephthalate, polyethylene naphthalate, polybutylene terephthalate, polyethylene terephthalate, and polycaprolactone),
- polycarbonates (as for example polyethylene carbonate, polypropylene carbonate, polybutylene carbonate or polyvinylene carbonate),
- polyacrylates (as for example polymethyl acrylate or polybutyl acrylate),
- polysulfides (as for example polyphenylene sulfide and polyethylene sulfide),
- polysiloxanes (as for example polydimethylsiloxane or polydiphenylsiloxanes),
- polyacetals (as for example polyoxymethylene), and copolymers thereof.

Prepolymers having polycarbonate or polyester backbones or mixtures thereof are used, for example, when there is a need for high tensile strength. In contrast, prepolymers having polysulfide or polyacrylonitrile-butadiene backbones exhibit excellent chemical resistance, and prepolymers having polyacrylate, polybutadiene, polysiloxane, and polyolefin backbones are used preferably when there is a demand for high photolytic resistance.

If the polymer backbone has no OH groups, it is functionalized with hydroxyl groups in order to permit the subsequent reaction. Such functionalization is preferably terminal, in other words at the two ends of the polymer backbone and/or optionally at the ends of the side chains, if the polymer backbone is branched. For example, a polyester backbone can be functionalized by means of alcohols with a functionality of two or more to form polyester polyols, whose alcohol groups can be subsequently transesterified. The same applies, for example, to polyolefin polyols as well. Such modifications are known to the skilled person. A polymer backbone which has primary, secondary or tertiary hydroxyl groups can also be functionalized terminally with groups having a functionality of two or more, in order, for example, to extend the chain length or to modify the properties. By means of an extension to the chain length it is possible, for example, to achieve a targeted increase in the viscosity. By functionalizing a polymer backbone having secondary hydroxyl groups by means of primary hydroxyl groups, it is possible to increase the reactivity of the polymer backbone. This may be carried out, for example, by subjecting pure polyoxypropylene polyols, after the end of the polypropoxylation reaction, to further alkoxylation with ethylene oxide, leading to ethylene oxide terminated (EO-endcapped) polyoxypropylene polyols.

On the prepolymer of the invention, the at least on average 1.5 carbonate or thiocarbonate groups are preferably arranged at the terminal ends of the polymer backbone. Such prepolymers of the invention are depicted below with the general formulae III and IIIa:

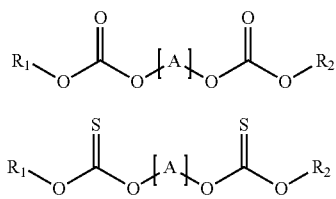

where $R_1$ and $R_2$ have the same definition as above. [A] stands for a linear or branched polymer backbone as already mentioned above.

The radicals $R^1$ and $R^2$ of the at least on average 1.5 carbonate or thiocarbonate groups are preferably both identical, more preferably selected from the group consisting of methyl, ethyl, phenyl, succinimide, maleinimide, propanol, butanol, and 1,3-propanediol, more particularly methyl and phenyl. The alcohols which form in the transesterification and especially in the subsequent polymerization, more particularly methanol, phenol, and ethanol, can be removed simply and quickly by distillation. These preferred radicals $R^1$ and $R^2$ permit a subsequent reaction with toxicologically unobjectionable silanes. Moreover, the reaction can be carried out without platinum catalysts.

The carbonate groups, arranged preferably terminally, can be reacted in a further step to form a carbamate or thiocarbamate.

On the prepolymer of the invention, the at least on average 1.5 carbamate or thiocarbamate groups are preferably arranged on the terminal ends of the polymer backbone. Such prepolymers of the invention are depicted below with the general formulae XIII and XIIIa:

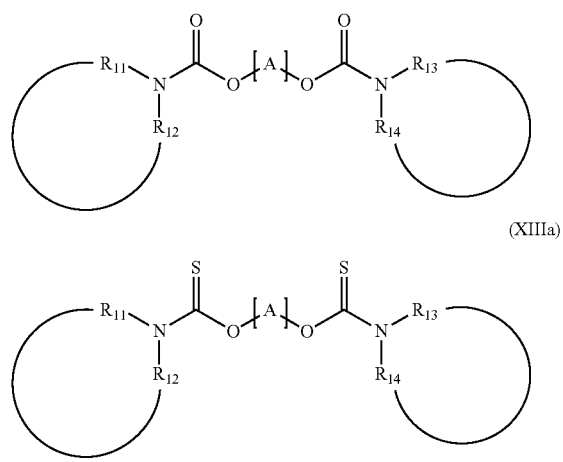

where $R_{11}$, $R_{12}$, $R_{13}$, and $R_{14}$ have the same definition as above. [A] stands for a linear or branched polymer backbone as already mentioned above.

The heterocyclic ring systems, formed by the radicals $R_{11}$ and $R_{12}$ and also $R_{13}$ and $R_{14}$, of the at least on average 1.5 carbamate and thiocarbamate groups are preferably both identical.

In one embodiment of the present invention the prepolymer of the invention has exactly two carbonate, thiocarbonate, carbamate or thiocarbamate groups. With particular preference these groups are arranged terminally.

If the polymer backbone has more than two primary, secondary or tertiary hydroxyl groups, then the number of carbonate, thiocarbonate, carbamate or thiocarbamate groups may be higher correspondingly. In this context, depending on the eventual properties of the polymer, it is conceivable for only some, or all, of the hydroxyl groups to be reacted. If, for example, the intention is to produce a polymer having high tensile strength, high hardness, and low elasticity, then the polymer backbone of the invention has a multiplicity of carbonate, thiocarbonate, carbamate or thiocarbamate groups, allowing a denser crosslinking to take place.

The mean number of carbonate, thiocarbonate, carbamate or thiocarbamate groups per prepolymer is preferably in a range from 1.5 to 20, preferably from 1.7 to 10. In the case of a linear polymer backbone, the number is between 1.5 to 2, generally higher in the case of a branched polymer backbone.

In one embodiment at least part of the polymer backbone is linear and preferably the entire polymer backbone is linear, particularly if the eventual crosslinked polymer is to have low hardness and high elasticity. If the prepolymer of the invention is linear, it preferably has an average molecular weight of 1000-100 000 g/mol, more preferably 5000-50 000 g/mol. The term "linear" in the present invention refers to a macromolecule of which the main chain is unbranched, where individual hydrogen atoms of the main chain may have been replaced by functional groups such as, for example, OH or carboxylic groups or by short alkyl radicals such as, for example, methyl, ethyl, propyl, isopropyl, or phenyl.

In an alternative embodiment it is possible for at least part of the polymer backbone to be branched. This means that the main chain of the macromolecule possesses one or more branchings (side chains), which in turn may optionally contain one or more ether, ester, carbonate, acrylate or sulfide groups and may optionally have a preferably terminal group of the formulae (IV) or (XIV)

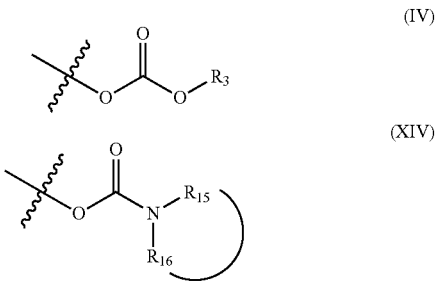

where $R^3$ has the same definition as $R^1$ and $R^2$, and $R^{15}$ and $R^{16}$ in each case together form a heterocyclic ring system which has the same definition as the heterocyclic ring systems formed from $R^{11}$ and $R^{12}$ and from $R^{13}$ and $R^{14}$ respectively. A prepolymer of this kind preferably comprises not only two terminal carbonate, thiocarbonate, carbamate or thiocarbamate groups, disposed at the two ends of the main chain, but also, additionally, x further carbonate, thiocarbonate, carbamate or thiocarbamate groups, where x represents the number of branchings in the polymer backbone. The higher the degree of branching of the polymer backbone, the harder the eventual crosslinked polymer. This effect may additionally be reinforced if the chain length of the branchings is short. If the prepolymer of the invention is branched, it preferably has an average molecular weight of 1000-100 000 g/mol, more preferably 5000-50 000 g/mol. In one embodiment, each branching has a terminal group of the formula IV or XIV.

The polymer backbone is preferably selected from the group of a polyether, polyester, polycarbonate, polysulfide, polysiloxane, polyacrylate, and copolymers thereof. With particular preference these have on each end, and—where present—on each branching, terminally, a primary, secondary or tertiary hydroxyl groups.

With particular preference the polymer backbone comprises a polyether, since the latter can be onward-processed directly without a further functionalization step. Possible polyethers in this respect are polyethylene glycol or polypropylene glycol, but also reaction products of low molecular mass polyfunctional alcohols with alkylene oxides. Polypropylene glycol is particularly preferred here and may be either linear or multiarm.

The alkylene oxides have preferably 2 to 4 carbons. Suitability is possessed for example by the reaction products of ethylene glycol, propylene glycol, the isomeric butanediols, the isomeric hexanediols, or 4,4'-dihydroxydiphenylpropane with ethylene oxide, propylene oxide or butylene oxide, or with mixtures of two or more thereof. Also suitable, furthermore, are the reaction products of polyfunctional alcohols, such as glycerol, trimethylolethane or trimethylolpropane, pentaerythritol or sugar alcohols, or mixtures of two or more thereof, with the stated alkylene oxides to form polyether polyols. Further polyether backbones are preparable by condensation of, for example, glycerol or pentaerythritol, with elimination of water. The preparation of such polyethers is known to the skilled person and described in detail in DE 10259248 A1, for example.

Further polyether backbones which are usable for the purposes of the invention may be obtained by polymerization of tetrahydrofuran (poly-THF).

Suitable polymer backbones are, moreover, polyethers which have been modified by vinyl polymers. Products of this kind are obtainable, for example, by polymerizing styrene-or acrylonitrile, or a mixture thereof, in the presence of a polyol.

Also suitable as polymer backbones are polyester polyols which are formed by reaction of low molecular mass alcohols, especially of ethylene glycol, diethylene glycol, propanediol, dipropylene glycol, neopentyl glycol, hexanediol, butanediol, pentanediol, hexanediol, propylene glycol, glycerol or trimethylolpropane with caprolactone.

Further suitable polyester polyols are preparable preferably by polycondensation. Polyester polyols of this kind preferably comprise the reaction products of polyfunctional, preferably difunctional alcohols (optionally together with small amounts of trifunctional alcohols) and polyfunctional, preferably difunctional and/or trifunctional, carboxylic acids or carboxylic anhydrides.

Instead of free polycarboxylic acids, it is also possible to use the corresponding polycarboxylic anhydrides or corresponding polycarboxylic esters with alcohols having preferably 1 to 3 carbons. Suitable for the preparation of such polyester polyols are, in particular, hexanediol, 1,4-hydroxymethylcyclohexane, 2-methyl-1,3-propanediol, butane-1,2,4-triol-triethylene glycol, tetraethylene glycol, ethylene glycol, polyethylene glycol, dipropylene glycol, polypropylene glycol, dibutylene glycol, and polybutylene glycol. The polycarboxylic acids may be aliphatic, cycloaliphatic, aromatic or heterocyclic or both. They may optionally be substituted, for example, by alkyl groups, alkenyl groups, ether groups or halogens. Examples of suitable polycarboxylic acids are succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimer fatty acid or trimer fatty acid, or mixtures of two or more thereof. It is possible optionally for there to be minor amounts of monofunctional fatty acids in the reaction mixture. Suitable tricarboxylic acids are preferably citric acid or trimellitic acid. The stated acids may be used individually or as mixtures of two or more thereof.

Other suitable polymer backbones are polyesters and especially polyester polyols formed from at least one of the stated dicarboxylic acids and glycerol and having a residual content of OH groups. This residual content ought to comprise at least two hydroxyl groups. Polyesters obtainable from lactones, based for example on ε-caprolactone, also called "polycaprolactones", or from hydroxycarboxylic acids, ω-hydroxycaproic acid, for example, may likewise be used. It is also possible, however, to use polyester polyols of oleochemical origin.

Such polyester polyols may be prepared, for example, by complete ring-opening of epoxidized triglycerides of a fatty mixture comprising at least partially olefinically unsaturated fatty acid, with one or more alcohols having 1 to 12 carbons, and subsequent partial transesterification of the triglyceride derivatives to form alkyl ester polyols having 1 to 12 carbons in the alkyl radical. Other suitable polyols are polycarbonate polyols and dimer diols, and also castor oil and its derivatives.

Likewise suitable as a polymer backbone are polyacetals. Polyacetals are compounds of the kind obtainable from glycols, as for example diethylene glycol or hexanediol or a mixture thereof, with formaldehyde. Polyacetals employable in the context of the invention may likewise be obtained through the polymerization of cyclic acetals.

Additionally suitable as a polymer backbone are polycarbonates. Polycarbonates may be obtained, for example, by the reaction of diols, such as propylene glycol, 1,4-butanediol or 1,6-hexanediol, diethylene glycol, triethylene glycol or tetraethylene glycol, or mixtures of two or more thereof, with diaryl carbonates—diphenyl carbonate, for example—or phosgene.

For the polymer backbone, polyols from vegetable or animal sources are also suitable. Since these polyols are usually short-chain, they may first be extended via a carbonate bond, for example. This leads to a polycarbonate based on natural material and having terminal hydroxyl groups.

Likewise suitable as polymer backbones are polyacrylates, especially those which still have additional OH groups. Polyacrylates of this kind are obtainable, for example, through the polymerization of ethylenically unsaturated monomers which carry an OH group. Such monomers are obtainable, for example, by the transesterification of ethylenically unsaturated carboxylic acids and difunctional alcohols, the alcohol being present in general in a slight excess. Examples of ethylenically unsaturated carboxylic acids suitable for this purpose are acrylic acid, methacrylic acid, crotonic acid or maleic acid. Corresponding esters carrying OH groups are, for example, 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxypropyl methacrylate, or mixtures of two or more thereof.

Yet further suitable polymer backbones are polyhydroxy-functional acrylonitrile/butadiene copolymers, as may be prepared, for example, from epoxides or amino alcohols and carboxyl-terminated acrylonitrile/butadiene copolymers which are available commercially under the name Hypro® CTBN from Emerald Performance Materials, LLC, USA.

Suitable polymer backbones also are copolymers which are connected to one another via a carbonate group through reaction of two or more polymer chains with a diorganocarbonate. The polymer chains used for this purpose may be identical or different. For example, various short-chain natural-substance polyols can be connected to one another via carbonate groups, and the length of the polymer backbone may be ascertained via the number of natural-substance polyols. One possible example is depicted in formula (V), in which [A1] and [A2] may be, for example, two different or two identical natural-substance polyols.

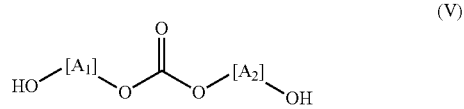

(V)

Further polymer backbones from copolymers may be carbonate-terminated polymer chains which are linked via a diamine, allowing the chain length to be increased correspondingly. One possible example is depicted in formula (Va), where [A1] and [A3] may be, for example, two different or two identical natural-substance polyols which, terminally, have a carbonate which has been linked to a diamine having the polymer chain [A2].

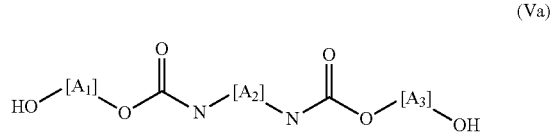

(Va)

Particularly suitable polymer backbones are contained, moreover, in European patent application EP 2 930 197, the content of which, especially in paragraphs 45-57, is hereby incorporated by reference into the present description.

To prepare a prepolymer of the invention, reactive compound each is bonded to the at least two primary, secondary or tertiary hydroxyl groups of the polymer backbone, said compound being selected from the group consisting of a diorganocarbonate, a diorgano-thiocarbonate, a cyclic carbonate, a cyclic thiocarbonate, an N,N-diheterocyclourea derivative, and an N,N-diheterocyclothiourea derivative.

In the case of the diorganocarbonate, it is possible in principle for the skilled person to use any known symmetrical or asymmetrical diorganocarbonate, with preference being given to the better reaction control. A preferred diorganocarbonate is a dialkyl carbonate or a diaryl carbonate, more particularly dimethyl carbonate, diethyl carbonate, dipropyl carbonate, dibutyl carbonate, methyl ethyl carbonate, diphenyl carbonate, N-N'-disuccinimidyl carbonate, allyl succinimidyl carbonate, methyl succinimidyl carbonate, ethyl succinimidyl carbonate, phenyl allyl carbonate, methyl phenyl carbonate, phenyl succinimidyl carbonate, or a mixture of these diorganocarbonate, and more preferably a dimethyl carbonate or a diphenyl carbonate. Relative to the hydroxyl groups, the diorganocarbonate is used in a ratio of 1:1 to 5:1. In the case of the cyclic carbonate, it is possible in principle for the skilled person to use any known cyclic carbonate. Preference is given to the cyclic carbonates selected from the group of propylene carbonate, butylene carbonate, glycerol carbonate, and vinylene carbonate.

For example, the prepolymer according to the general formula IIIb may be obtained as follows:

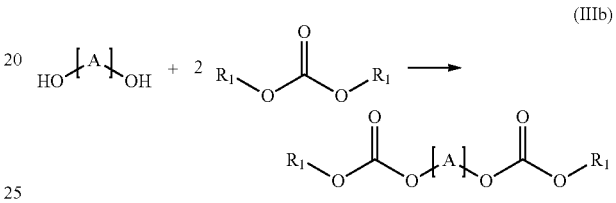

(IIIb)

where [A] and $R_1$ have the same definition as above.

In the reaction scheme above it is readily apparent that the at least on average 1.5 carbonate groups are bonded directly via one oxygen atom each to the polymer backbone.

This one oxygen atom each therefore has its origin in the transesterification reaction of a primary, secondary or tertiary hydroxyl group of the polymer backbone and a diorganocarbonate or a cyclic carbonate.

Alternatively the prepolymer according to the general formula XIIIb may be obtained as follows:

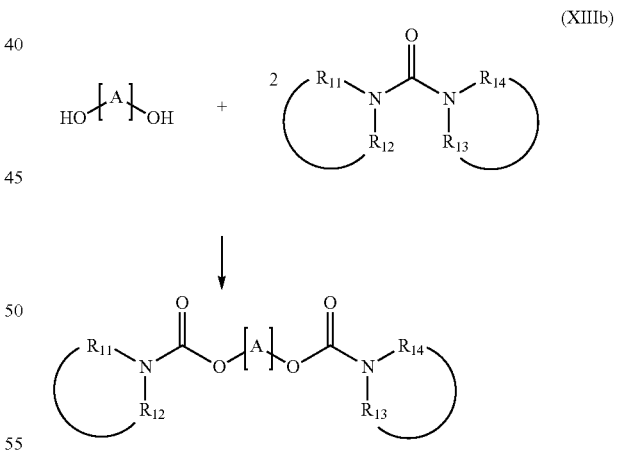

(XIIIb)

where [A] and $R^{11}$, $R^{12}$, $R^{13}$, and $R^{14}$ have the same definition as above.

The reaction with the at least two primary, secondary or tertiary hydroxyl groups of the polymer backbone may be accelerated by a catalyst. The catalyst may comprise heterogeneous or homogeneous catalysts, such as, for example, MCM-41 (Mobil Composition of Matter No. 41; a mesoporous material with a hierarchical pore structure from a family of silicatic and aluminosilicatic solids), organically modified MCM-41, Mg/La metal oxides, nanocrystalline MgO, LiOH, $Li_2CO_3$, $K_2CO_3$, $Cs_2CO_3$, $Mg_5(OH)_2(CO_3)_4$, zirconium(IV) butoxide, zirconium(IV) propoxide, zirconium(IV) tert-butoxide, zirconium(IV) isopropoxide, titanium tetraalkoxide, bibutyltin dilaurate, dibutyltin oxide, bistributyl tin oxide, yttrium(III)acetylacetonate, zirconium (III)acetylacetonate, ytterbium(III)acetylacetonate, 1,8-diazabicyclo[5.4.0]undec-7-ene (DBU), 1,5-diazobicyclo[4.3.0]non-5-ene (DBN), triflates such as, for example bismuth(III)triflate, lanthanum(III)triflate, ytterbium(III)triflate, yttrium(III)triflate, zirconyl triflate 1,5,7-triazabicyclo[4.4.0]dec-5-ene (TBD), pyridine, 4-(dimethylamino)pyridine, 1,4-diazabicyclo[2.2.2]octane, a trimethylsilylamide such as, for example, lithium bis(trimethylsilyl)amide, $ZrCl_2$, $SnCl_2$ or N-heterocyclic carbenes such as, for example, 1,3-bis(2,4,6-trimethylphenyl)imidazol-2-ylidene. Other possible catalysts for the transesterification are described in European patent application EP 2 308 914, especially in paragraphs 40 to 42, and are hereby incorporated by reference into the filing text. On account of the high reactivity of the heterocyclic ring systems, this reaction is carried out preferably without catalyst.

The reaction takes place preferably at −20 to 200° C., more preferably at 20 to 120° C.

The prepolymer of the invention is preferably selected from the group consisting of

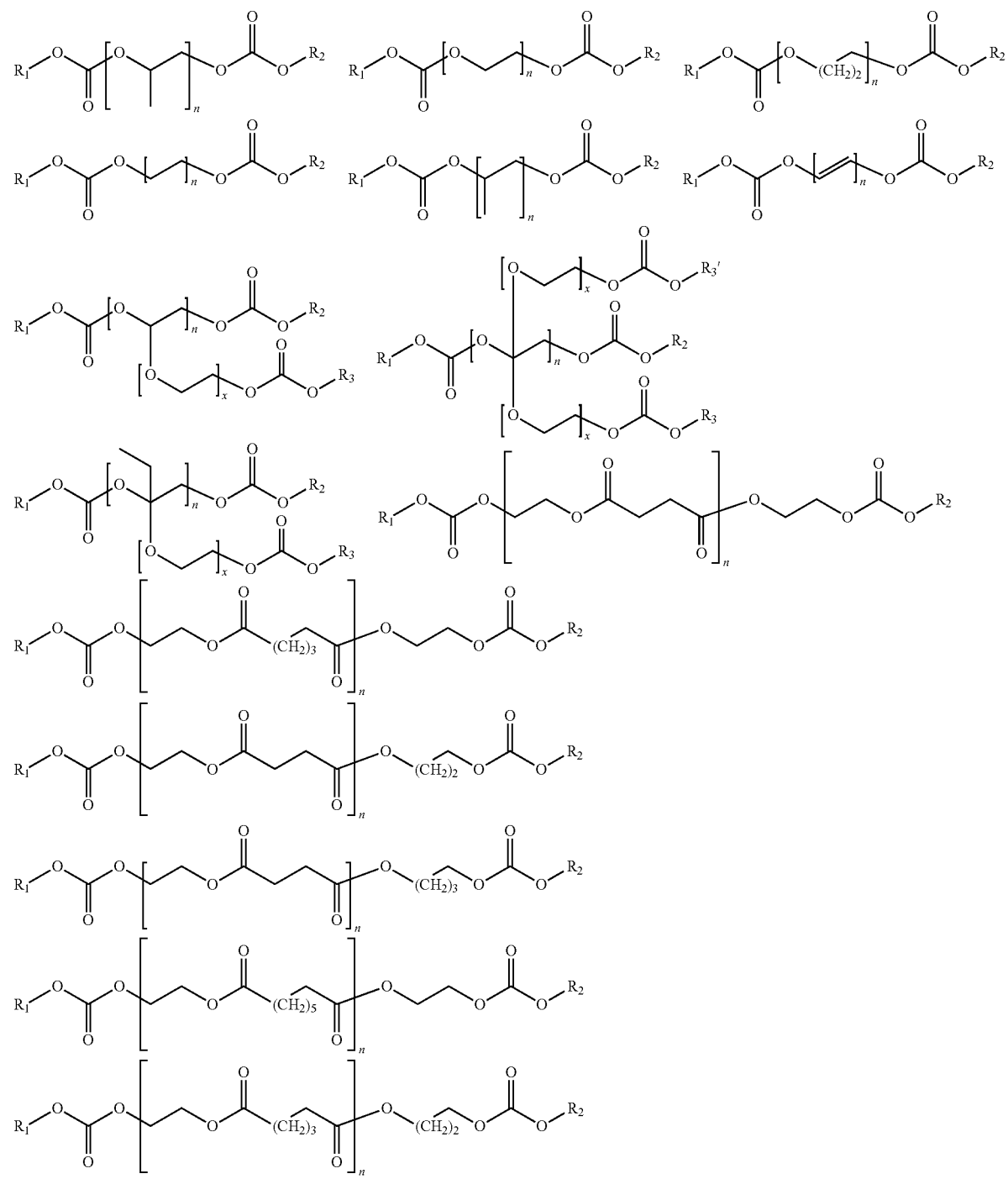

-continued
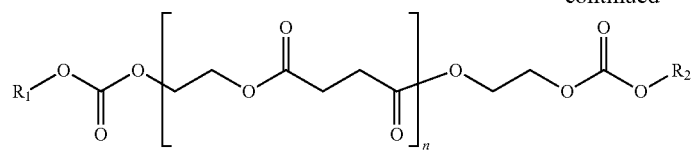
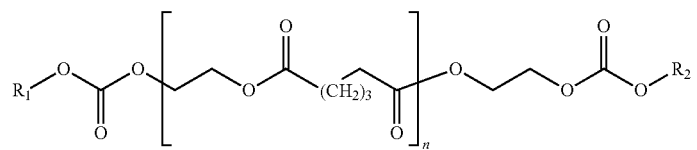
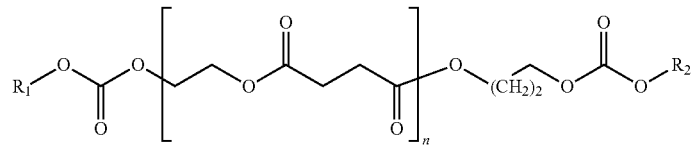
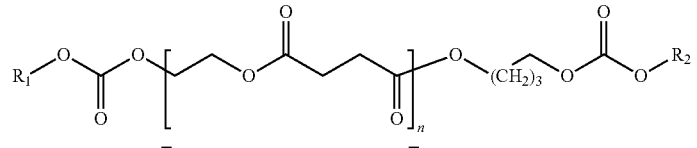
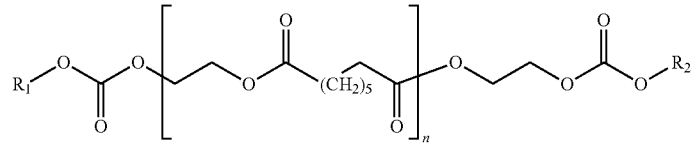
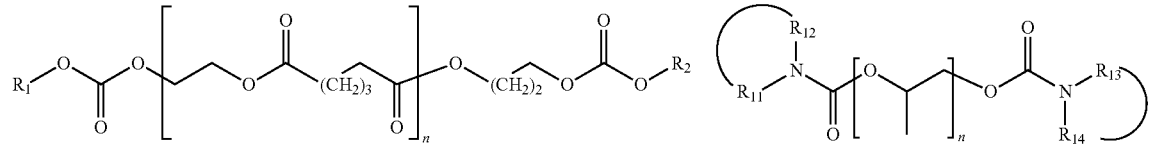
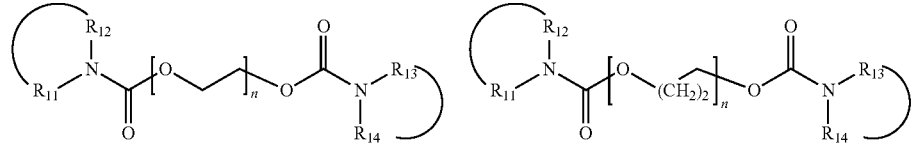
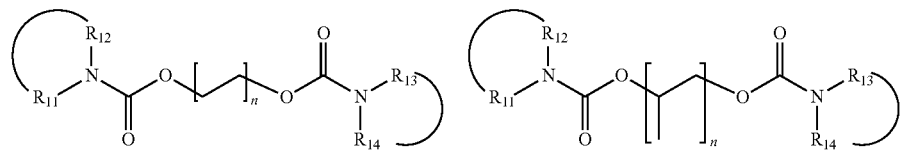
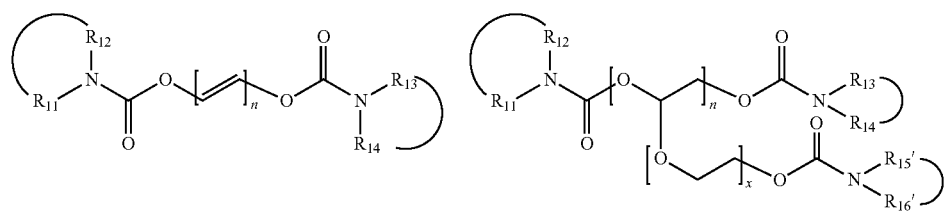
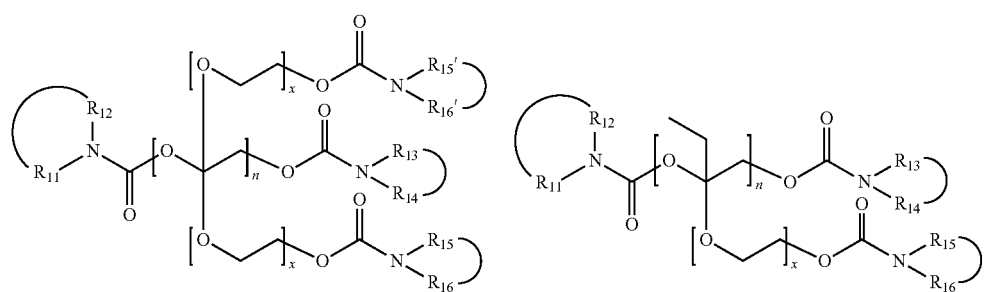

-continued

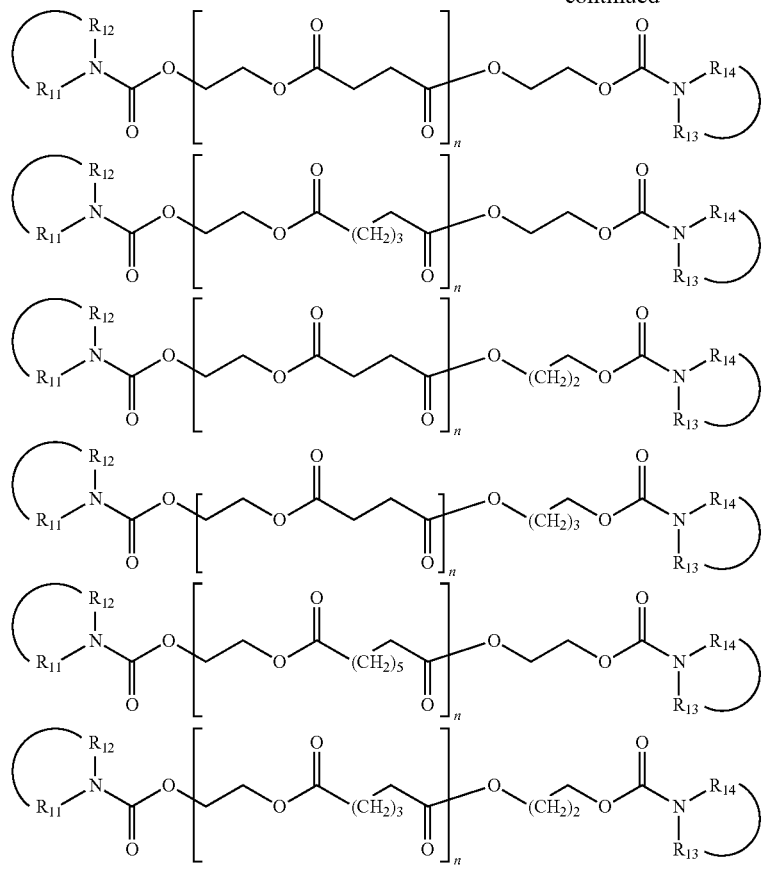

in which
- n is the number of monomer units and the molecular weight is between 1000 and 100 000 g/mol, preferably between 5000 and 50 000 g/mol, and so defines the number n of the monomer units;
- $R^1$, $R^2$, $R^3$, and $R^{3'}$ are, independently of one another, linear or branched $C_1$ to $C_6$ alkyl, $C_1$ to $C_6$ acyl, $C_3$ to $C_8$ cycloaliphatic, $C_6$ to $C_{10}$ aryl or imide radicals. Preferably all the radicals $R^1$, $R^2$, $R^3$, and $R^{3'}$ are identical, more preferably methyl, ethyl or phenyl, and especially preferably methyl, and
- $R^{11}$ and $R^{12}$, $R^{13}$ and $R^{14}$, $R^{15}$ and $R^{16}$, and also $R^{15'}$ and $R^{16'}$ in each case together form heterocyclic ring systems which may be aromatic or nonaromatic and are independent of one another, and where these ring systems may contain further heteroatoms selected from the group of oxygen, nitrogen, and sulfur, or may contain functional groups selected from the group of acyl and thioacyl.

The prepolymer of the invention is used preferably for the isocyanate-free preparation of an alkoxysilane polymer. In that case it is possible to do without the use of toxic isocyanates, hence significantly reducing the environmental dangers associated with the preparation.

In this case the prepolymer of the invention is reacted either
(A) with an aminoalkoxysilane or a mercaptoalkoxysilane, optionally in the presence of a catalyst, or
(B) with a diamine, a triamine, a dithiol or a trithiol to give a modified prepolymer and subsequently reacted with an alkoxysilane compound containing an epoxide group,
where an alkoxysilane polymer is formed.

In the reaction step of variant (A), accordingly, the prepolymer of the invention in one embodiment undergoes onward reaction with an aminoalkoxysilane to form a carbamate (urethane). The reaction takes place preferably at −20 to 150° C., more preferably at 20 to 100° C.

The aminoalkoxysilane is preferably a compound selected from the group of 3-aminopropyltrimethoxysilane, 3-aminopropyltriethoxysilane, N-(n-butyl)-3-aminopropyltrimethoxysilane, N-(n-butyl)-3-aminopropylmethyldimethoxysilane, N-(n-butyl)-3-aminopropyltriethoxysilane, N-ethylaminoisobutyl-trimethoxysilane, N-ethylaminoisobutylmethyldimethoxysilane, 3-piperazinopropyltrimethoxysilane, 3-piperazinopropylmethyldimethoxysilane, 3-piperazinopropyltriethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, N-cyclohexyl-3-aminopropyltriethoxysilane, and N-cyclohexyl-3-aminopropyltrimethoxysilane. Also suitable are alpha-silanes such as, for example, N-cyclohexylaminomethyl-trietoxysilane and N-(6-aminohexyl)aminomethoxyltriethoxysilanes, or ureidosilanes such as, for example 3-ureidopropyltrimethoxysilane. Another suitable alkoxysilane is an equimolar reaction product of a diamine with an epoxysilane, such as, for example, the equimolar reaction product of piperazine and 3-glycidoxypropyltrimethoxysilane. Particularly preferred are alkoxysilanes having a primary amino group or a cyclic amino group, since these are particularly reactive.

For this reaction it is possible to use one of the catalysts already described for the transesterification step. The reaction therefore leads to a polymer on which an alkoxysilane is bonded via a urethane group, without any need to use isocyanate, this being exceptionally advantageous on environmental grounds.

In the reaction step of variant (A), in another embodiment, the prepolymer of the invention undergoes onward reaction with a mercaptoalkoxysilane to form a thiocarbonate. The reaction takes place preferably at −20 to 150° C., more preferably at 20 to 100° C.

The thiol is preferably a mercaptoalkoxysilane selected from the group of 3-mercaptopropyltrimethoxysilane, 3-mercaptopropyltriethoxysilane, 3-mercaptopropylmethyldimethoxysilanes, and 3-mercaptopropyltrimethoxysilane.

In the case of the reaction step of variant (B), the prepolymer of the invention is reacted with a suitable diamine, triamine, dithiol or trithiol, optionally in the presence of a catalyst.

Examples of possible diamines in this context are hexamethyldiamine, octamethylenediamine, methylpentanediamine, meta-xylylenediamine, trimethylenehexamethylenediamine, piperazine, aminoethylpiperazine or isophoronediamine.

Examples of possible triamines are pentane-1,2,5-triamine, 1,2,3-propanetriamine, phenyl-1,2,4-triamine, phenyl-1,3,5-triamine, pyrimidine-2,4,6-triamine.

Possible mercapto compounds for this reaction are described in detail in EP 1 944 329, especially in paragraphs 68 to 71, the content of which is hereby incorporated by reference into the description. Examples are dithiothreitol, 1,2-ethanedithiol, 1,2-propanedithiol, 1,3-propanedithiol, 1,4-butanedithiol, 1,5-pentanedithiol, 1,6-hexanedithiol, 1,7-heptanedithiol, 1,8-octanedithiol, 1,9-nonanedithiol, 1,10-decanedithiol, 1,12-dodecanedithiol, 2,2-dimethyl-1,3-propanedithiol, 3-methyl-1,5-pentanedithiol, 2-methyl-1,8-octanedithiol, 1,1,1-tris(mercaptomethyl)ethane, 2-ethyl-2-mercaptomethyl-1,3-propanedithiol, tetrakis(mercaptomethyl)methane, 1,4-cyclohexanedithiol,1,4-bis(mercaptomethyl)cyclohexane, bis(2-mercaptoethyl) ether, bis(2-mercaptoethyl) sulfides, bis(2-mercaptoethyl) disulfide, 2,5-bis(mercaptomethyl)-1,4-dioxane, 2,5-bis(mercaptomethyl)-1,4-dithiane, 3,3'-thiobis(propane-1,2-dithiol), 2,2'-thiobis(propane-1,3-dithiol); and aromatic, substituted or unsubstituted compounds containing mercapto groups, such as thiophenol, 1,2-benzenedithiol, 1,3-benzenedithiol, 1,4-benzenedithiol, 1,3,5-benzenetrithiol, toluene-3,4-dithiol, mercaptomethylbenzene, 1,2-bis(mercaptomethyl)benzene, 1,3-bis(mercaptomethyl)benzene, 1,4-bis(mercaptomethyl)benzene, and 1,3,5-tris(mercaptomethyl)benzene.

The resultant modified prepolymer with the at least two amino groups bonded via carbamate groups is subsequently reacted, in a second step, with an alkoxysilane compound having an epoxide group, to form the alkoxysilane polymer. This reaction between a terminal amine of a polymer and an alkoxysilane compound having an epoxide group is described in European patent application EP 2 341 116, especially in paragraphs [0024] to [0042]. The content thereof is hereby incorporated by reference into the description.

If the alkoxysilane polymer is obtained by reaction of a modified prepolymer with at least one alkoxysilane compound having an epoxide group, then the preferred number of silyl groups per polymer in the case of primary amino groups is generally between 1 and twice the number of amino groups, and in the case of secondary amino groups between 1 and once the number of amino groups. The same applies in respect of prepolymers which have been modified with dithiols.

The reactivity between the prepolymer having the at least two amino or mercapto groups and the compound having the epoxide group is relatively high. The reaction may optionally be accelerated further by the presence of a catalyst. Possible catalysts are triflates such as, for example, bismuth (III)triflate, lanthanum(III)triflate, ytterbium(III)triflate, yttrium(III)triflate, zirconyl triflate, tertiary amines such as, for example, triethylamines, benzyldimethylamines, triethanolamines, phenol derivatives such as tris(dimethylaminomethyl)-phenol.

If a modified prepolymer having at least two primary or secondary amino group or at least two thiol groups is reacted, according to reaction variant (B), with an alkoxysilane compound having an epoxide group, then the structural formula of the latter compound is preferably (VI):

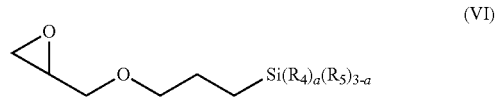

(VI)

where $R_4$ is an alternatively substituted and/or heteroatom-comprising hydrocarbyl radical and $R_5$ is an alkoxy, acetoxy, oxime or amine radical, and a is 0, 1, 2 or 3.

Generally speaking, $R_4$ is a methyl or ethyl radical. Also conceivable as R4, however, is an aromatic, an ester or a thioester or a thioether. R5 is preferably a methoxy or ethoxy radical.

Conceivable in particular, accordingly, is (3-glycidyloxypropyl) dimethoxymethylsilane, (3-glycidyloxypropyl) trimethoxysilane, (3-glycidyloxypropyl)diethoxymethylsilane or (3-glycidyloxypropyl) triethoxysilane.

Further alkoxysilane compounds having an epoxide group and conceivable for the purposes of the present invention are listed in WO 2008/031895 (page 7, No. 41 to 47), the content of which is hereby incorporated by reference. Mention may further be made in this regard of [2-(3,4-epoxycyclohexyl)ethyl]trimethoxysilane.

Alternatively it is also possible for the prepolymer of the invention having the at least on average 1.5 carbonate groups to be transesterified, before the reaction steps according to variant (A) or variant (B), with an alcohol or an activated alcohol (variant (C)). The activated alcohol is preferably glycerol carbonate. The reaction leads to a modified prepolymer with cyclic carbonate groups additionally bonded to its linear carbonate groups.

The cyclic carbonate groups have a significantly greater reactivity. Subsequently it is possible for an aminoalkoxysilane or a mercaptoalkoxysilane to be bonded to the modified prepolymer via a hydroxyurethane or a hydroxythiourethane bond.

The average number of silyl groups per alkoxysilane polymer is preferably in a range from 1 to 10 and is dependent on the number of carbonate groups in the prepolymer. In the case of a linear polymer backbone, the number is generally approximately 2, while for a branched polymer backbone it is generally higher.

The alkoxysilane polymers obtained in accordance with the above-described reaction processes (variant (A), variant (B) or variant (C)) are preferably included in a composition which is used as a moisture-curing sealant or adhesive. A composition of this kind is substantially anhydrous. After contact with atmospheric moisture, a moisture-curing sealant or adhesive cures to form a sealing means or adhesive.

With exclusion of atmospheric moisture, the alkoxysilane polymers obtainable in accordance with the invention are storage-stable.

In particular, when the compound is used in a sealant or adhesive composition, it is possible through the choice of the polymer backbone on the one hand to influence the properties of the pasty composition, such as, for example, the toxic profile, the viscosity, rheology, processing properties, sag resistance, and so on. On the other hand it is possible through the choice of the polymer backbone to influence the properties of the cured material. Hence it is possible to establish the desired properties in respect in particular of the resistance—that is, for example, the heat resistance, the fire resistance, the low-temperature flexibility, the low-temperature processing properties, the UV stability, the weather stability, the chemical resistance, the excrement resistance, the resistance to oil and fuels, the water resistance, and the abrasion resistance—but also in respect of the mechanical properties—that is, for example, the tensile strength, the hardness, the elasticity, and the tack. Similar comments apply in respect of the permeability—i.e., the water, vapor, and gas permeability—and in respect of the toxic profile—that is, for example, the food compatibility, the drinking-water compatibility, and the biodegradability—of the cured sealant or adhesive composition, these properties being adjustable according to demand.

Especially when the compound of the invention is used in an adhesive composition it is possible to adjust the adhesion properties—that is, for example, the plastics adhesion, the wet adhesion, the adhesion to porous and alkaline or acidic surfaces, and the adhesion to wet substrates—in a suitable way for the particular end use through a corresponding choice of the polymer backbone. Moreover, the polymer backbone critically defines the physical properties of the cured material, such as the refractive index and the electrical, thermal, and acoustic conductivity or insulation, respectively.

Preferred, further, are compounds in which the polymer backbone is at least partially or completely polysulfide functionalized—preferably terminally—with hydroxyl groups. Such eventual polymers lead to sealants and adhesives offering good wet adhesion and also possessing high chemical, thermal and photolytic stability.

On the basis of the variability of the possible properties which can be established, the alkoxysilane polymers of the present invention are suitable especially for use in fields of application in which such "tailoring" of properties is desired. Preference is given, for example, to use in the construction, mechanical, electrical, vehicle or aeronautical industries, in which, for instance, the water resistance and the gas permeability for sheetlike seals, the mechanical properties and adhesion properties of structural bonds, and also, for instance, the fire protection properties of the corresponding composition, etc. can be adjusted.

The chemical resistance obtainable by virtue of the prepolymer, particularly the resistance to oil and fuels, of the alkoxysilane polymers also allows them to be used in the automobile industry.

Also conceivable otherwise, for instance, is use in marine construction, on the basis of the obtainable weather resistance, or in electronic applications, on the basis of the obtainable insulating properties. For latter applications, moreover, it is possible in accordance with the invention to choose a silicone-free system, hence allowing the drawbacks in terms of exudation that are observed with conventional silicone materials to be circumvented.

The alkoxysilane polymer can be used, furthermore, in coatings such as, for example, antiscratch coatings, adhesion or antistick coatings, antigraffiti coatings, or coatings for textiles. The alkoxysilane polymer may be used generally in 1-component or 2-component systems. Further possibilities are for use in isocyanate-free foams for construction and industrial applications, or, for example, as a viscoelastic foam or as a cold foam in mattress production. Also conceivable, furthermore, is use as shape-memory polymers, which can be employed, for example, in medical engineering, robotics or the automobile industry.

According to a further aspect of the present invention, it is possible to use the prepolymer of the invention or the modified prepolymer to form completely isocyanate-free polyurethanes or (poly)hydroxyurethanes.

For example, the prepolymer of the invention can be reacted with a blocked diamine. A feature of a blocked diamine is that the amino groups are activated only through contact with water (or moisture). One example of a blocked diamine is Vestamin A139. The blocked diamine reacts with atmospheric moisture to form a diamine, which subsequently causes the organocarbonate- or carbamate-terminated prepolymer to cure to a polyurethane or a polyhydroxyurethane. An adhesive of this kind, comprising a blocked diamine and the prepolymer of the invention, is stable over the long term and heat-resistant.

The invention is elucidated further with the following examples.

EXAMPLE 1

Methyl Carbonate-Terminated Polyether with Aminosilane 95.7 g of polyether diol (Desmophen 4028BD from Covestro) are refluxed at 120° C. for 18 h with 17.3 g of dimethyl carbonate (4:1 based on OH groups) and 0.1 g of 1,5,7-triazabicyclo[4.4.0]dec-5-ene (TBD). The methanol formed and the excess of dimethyl carbonate can be subsequently distilled off under reduced pressure. The product obtained is methyl carbonate-terminated polyether.

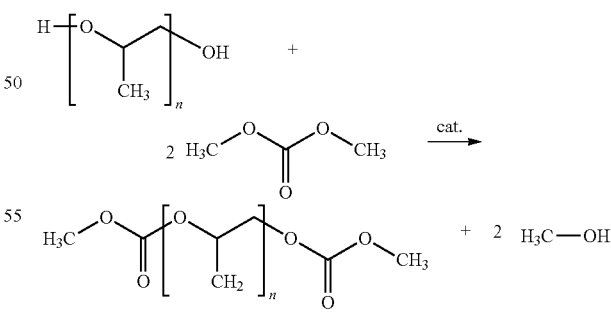

50 g of the methyl carbonate-terminated polymer are reacted with 4.3 g of 3-aminopropyltrimethoxysilane and 0.1 g of 1,5,7-triazabicyclo[4.4.0]dec-5-ene (TBD) at 60° C. for 24 h. The methanol formed is removed by distillation. The product obtained is trimethoxysilane-terminated polyether. The trimethoxysilane groups are joined to the polyether via a urethane bond.

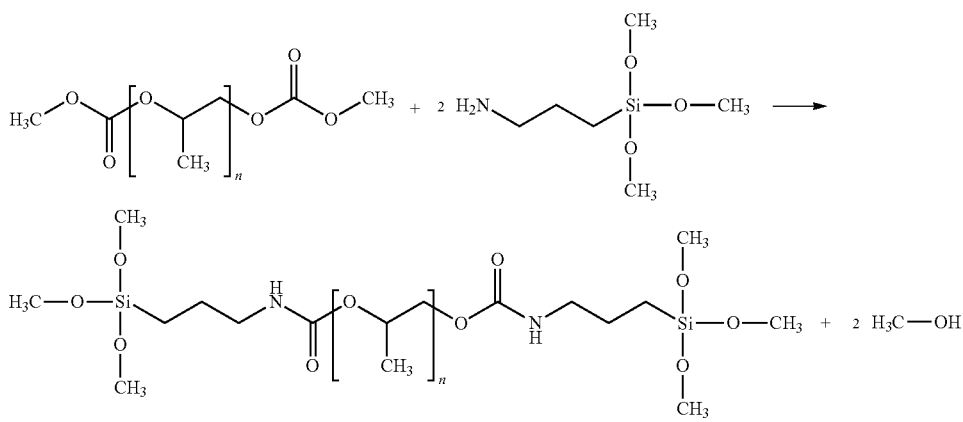

The polymer can be used for producing moisture-curing adhesives, sealants, and coating materials on the basis of silane-terminated polymers.

EXAMPLE 2

Methyl Carbonate-Terminated Polyether with a Diamine, Subsequent Reaction with Epoxysilane 95.7 g of polyether diol (Desmophen 4028BD from Covestro) are refluxed at 120° C. for 18 h with 17.3 g of dimethyl carbonate (4:1 based on OH groups) and 0.1 g of 1,5,7-triazabicyclo[4.4.0]dec-5-ene (TBD). The methanol formed and the excess of dimethyl carbonate can be subsequently distilled off under reduced pressure. The product obtained is methyl carbonate-terminated polyether. 50 g of the methyl carbonate-terminated polymer are reacted with 2.84 g of hexamethylenediamine and 0.1 g of 1,5,7-triazabicyclo[4.4.0]dec-5-ene (TBD) at 60° C. for 24 h. The methanol formed is removed by distillation. The product obtained is an amine-terminated polyether. This polyether can be reacted with an alkoxysilane compound having an epoxide group, as for example (3-glycidyloxypropyl) trimethoxysilane, to form a trimethoxysilane-terminated polyether. Such reactions are described in detail in European patent application EP-A-2 341 116, hereby referenced.

The resulting polymer can be used for producing moisture-curing adhesives, sealants, and coating materials on the basis of silane-terminated polymers.

EXAMPLE 3

Curing of a Methyl Carbonate-Terminated Polyether to form an Isocyanate-Free Polyurethane 95.7 g of polyether diol (Desmophen 4028BD from Covestro) are refluxed at 120° C. for 18 h with 17.3 g of dimethyl carbonate (4:1 based on OH groups) and 0.1 g of 1,5,7-triazabicyclo[4.4.0]dec-5-ene (TBD). The methanol formed and the excess of dimethyl carbonate can be subsequently distilled off under reduced pressure. The product obtained is methyl carbonate-terminated polyether.

50 g of the methyl carbonate-terminated polymer are mixed with 1.42 g of hexamethylenediamine and 0.1 g of 1,5,7-triazabicyclo[4.4.0]dec-5-ene (TBD), optionally in a solvent or in water, in the presence of auxiliaries such as stabilizers and emulsifiers at 90° C. for 24 h. The molar mass of the polyether-polyurethane can be influenced by the auxiliaries and reaction conditions. The resulting dispersion can subsequently be used, for example, for polyurethane dispersion-based adhesives.

EXAMPLE 4

Imidazole Carbamate-Terminated Polyether with Aminosilane 95.5 g of polyether diol (Desmophen 4028BD from Covestro) are stirred under nitrogen at 60° C. for 12 h with 7.76 g of 1,1'-carbonyldiimidazole (CDI) (1:1 based on OH groups). The product obtained is imidazole carbamate-terminated polyether.

50 g of the imidazole carbamate-terminated polymer are reacted with 4.3 g of 3-aminopropyltrimethoxysilane at 60° C. for 24 h. The product obtained is trimethoxysilane-terminated polyether. The trimethoxysilane groups are joined to the polyether via a urethane bond.

The resulting trimethoxysilane-terminated polymer can be catalyzed without tin and crosslinks following addition of 0.2% of 1,8-diazabicyclo[5.4.0]undec-7-ene and 1% of 3-aminopropyltrimethoxysilane, under atmosphere moisture, to form an elastic material having a Shore A hardness of 41 after 7 days.

The invention claimed is:

1. A process for preparing an alkoxysilane polymer comprising:
reacting a prepolymer comprising, at least on average, 1.5 carbonate groups of the formulae (I) and (II), 1.5 thiocarbonate groups of the formulae (Ia) and (IIa), 1.5 carbamate groups of the formulae (XI) and (XII), or 1.5 thiocarbamate groups of the formulae (XIa) and (XIIa)

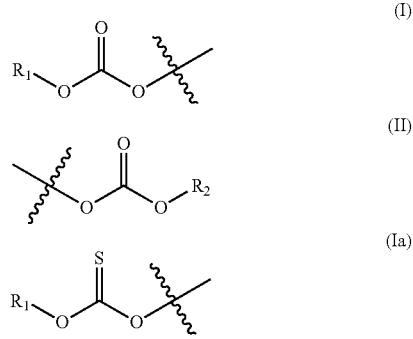

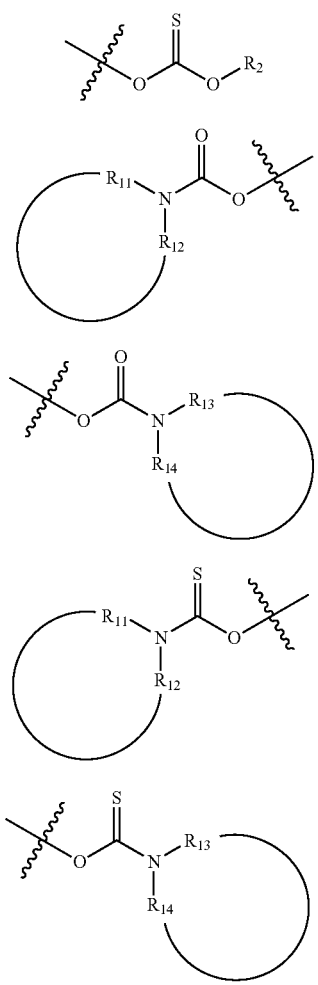

in which $R^1$ and $R^2$ independently of one another are linear or branched $C_1$ to $C_6$ alkyl, $C_1$ to $C_6$ acyl, $C_3$ to $C_8$ cycloaliphatic, $C_6$ to $C_{10}$ aryl or imide radicals or $C_3$ to $C_6$ alcohols, $R^{11}$ and $R^{12}$ and also $R^{13}$ and $R^{14}$ in each case together form heterocyclic ring systems which may be aromatic or nonaromatic and are independent of one another, and wherein these ring systems may contain further heteroatoms selected from the group of oxygen, nitrogen, and sulfur or may contain functional groups selected from the group of acyl and thioacyl, wherein the at least on average 1.5 carbonate, thiocarbonate, carbamate or thiocarbamate groups are bonded directly via one oxygen atom each to the polymer backbone of the prepolymer, this one oxygen atom each having its origin in the reaction of a primary, secondary or tertiary hydroxyl group of the polymer backbone and a reactive compound selected from the group consisting of a diorganocarbonate, a diorganothiocarbonate, a cyclic carbonate, a cyclic thiocarbonate, an N,N-diheterocyclourea derivative, and an N,N-diheterocyclothiourea derivative with:

(A) an aminoalkoxysilane or a mercaptoalkoxysilane, optionally in the presence of a catalyst, or (B) a diamine, a triamine, a dithiol or a trithiol to give a modified prepolymer and subsequently carrying out reaction with an alkoxysilane compound comprising an epoxide group, to form the alkoxysilane polymer.

2. The process as claimed in claim 1, wherein, before the reaction with (A) or (B), the prepolymer is reacted with an alcohol or with an activated alcohol.

3. The process as claimed in claim 1, wherein the aminoalkoxysilane in (A) is selected from the group of 3-aminopropyltrimethoxysilane, 3-aminopropyltriethoxysilane, N-(n-butyl)-3-aminopropyltrimethoxysilane, N-(n-butyl)-3-aminopropylmethyldimethoxysilane, N-(n-butyl)-3-aminopropyltriethoxysilane, N-ethylaminoisobutyltrimethoxysilane, N-ethylaminoisobutylmethyldimethoxysilane, 3-piperazinopropyltrimethoxysilane, 3-piperazinopropylmethyldimethoxysilane, 3-piperazinopropyltriethoxysilane, N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, and an equimolar reaction product of piperazine and glycidoxypropyltrimethoxysilane, and the mercaptoalkoxysilane is selected from the group of 3-mercaptopropyltrimethoxysilane, 3-mercaptopropyltriethoxysilane, 3-mercaptopropylmethyldimethoxysilane and 3-mercaptopropyltrimethoxysilane.

* * * * *